Figure 1:
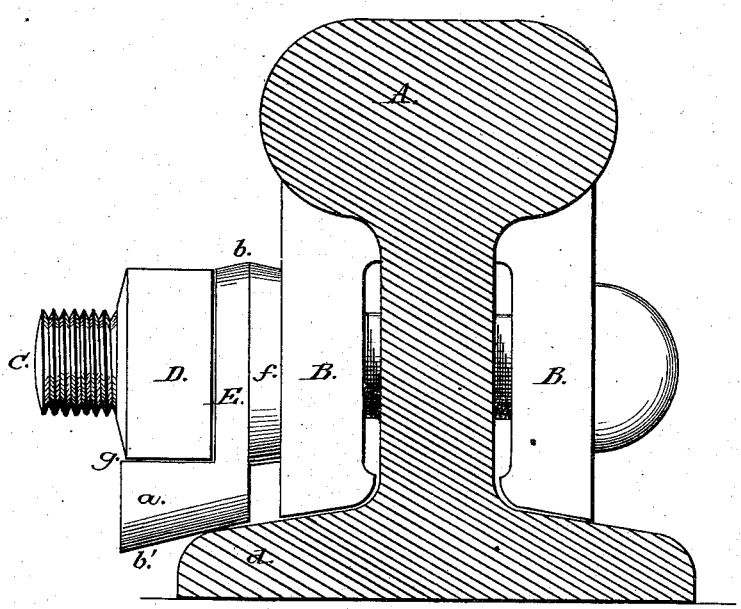

O. B. LATHAM.
Nut-Lock.

No. 164,846.

Patented June 22, 1875.

Witnesses:

Inventor:
Obadiah B. Latham

UNITED STATES PATENT OFFICE.

OBADIAH B. LATHAM, OF SENECA FALLS, NEW YORK.

IMPROVEMENT IN NUT-LOCKS.

Specification forming part of Letters Patent No. 164,846, dated June 22, 1875; application filed April 12, 1875.

*To all whom it may concern:*

Be it known that I, OBADIAH B. LATHAM, of Seneca Falls, in the county of Seneca and State of New York, have invented certain new and useful Improvements in Nut-Locks; and I do hereby declare the following to be a full, clear, and exact description of the invention, such as will enable others skilled in the art to which it pertains to make and use it, reference being had to the accompanying drawings, which form part of this specification.

My invention relates to a gib-washer for use in connection with bolts for securing fish-plates to railroad-rails, and for other like purposes, the object of which is to cause the washer to tighten or screw the nut on the bolt by gravitating from a position in which it is located, and turning the nut with it. A further object of the invention is to lock the nut on the bolt by means of the gravitating washer, so as to prevent it from unscrewing by any jarring, strain, or friction to which it may be subjected. It consists in constructing the washer of an oblong form, with parallel or radiating sides, and concentrically-curved ends. The eye of the washer is made near one end, so as to give the preponderance of weight to the other end, which is still further increased by a right-angular projection therefrom like a gib-head, which increases the weight of the gravitating extension, and causes the washer to turn on the bolt and assume a pendent vertical position with respect thereto. The right-angular recess formed by the face of the washer and the projection on its lower end make a seat for the reception of the nut, which, when placed on the bolt in connection with the washer, is compelled to turn with it. The washer also acts as a gib for holding the nut and locking it on the bolt.

Similar letters of reference indicate corresponding parts in all the figures of the drawing.

Figure 2:
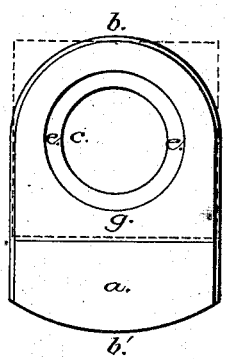
Figure 3:
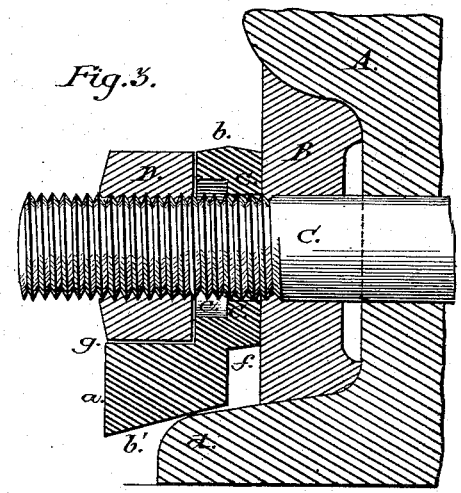

Figure 1 is a side elevation of the improved washer, showing its position with respect to the fish-plates, bolt, and nut. Fig. 2 is a front view of the same. Fig. 3 is a vertical transverse section of the same.

The washer is shown and described as applied to railway fish-plates; but its utility is not confined to this particular purpose.

A is a vertical section of a railroad-rail, forming part of a fish-joint. B B' are the fish-plates; and C is the bolt securing the plates to the rail. The bolt is of the form usually employed for this purpose, having a square or elliptical shank near the head, or with a T-shaped head, to prevent it from turning after being placed in position. The nut D is of the ordinary square form; but other forms may be used, if desirable. E is the gib-washer. It is of an oblong form, as shown, with parallel or radiating sides, and having a projection, $a$, extending out from its face at one end. The ends $b$ $b'$ of the washer are curved concentrically to the eye $c$, which is made nearer the end $b$, so that the preponderance of weight will attach to the lower end $b'$. This end $b'$ is also beveled, as shown, in order to give it as much weight as possible, but at the same time to keep it clear of the flange $d$. The construction of this washer is such that the influence of gravity on the weighted end $b'$ causes it to assume, when placed on the bolt, the pendent vertical position shown in the drawing. In the face of the washer the annular groove $e$ is formed around the eye $c$. This groove is intended to contain a material for lubricating the thread of the bolt and nut, and the bearing-surface of the washer, for the purpose of facilitating the gravitating movement, and also to preserve the threads of the nut and bolt by preventing them from oxidizing. On the rear of the washer the circular shoulder or disk $f$ is formed. This disk constitutes the only point of contact between the washer and the fish-plate, so that the frictional surface or bearing of the washer is confined to the extent of this disk, and thus as little resistance as possible is offered, by friction, to the gravitation of the washer. The construction of the washer with the projection $a$ forms a recess or seat, $g$, in which the nut D is placed when screwed on the bolt, so that any movement of the washer is partaken of by the nut.

The operation of the device is as follows: The bolt having been passed through the plates and rail from the inside of the track, the washer is placed on the bolt, with the nut in the recess $g$, as shown in Fig. 1. The nut is then screwed on as far as it will go, care being taken to keep it in the recess or seat $g$.

The washer should be located, by means of the nut, (where there is a right-hand thread on the bolt,) a little to the right of the center of gravity of the bolt, so that any jarring, strain, or friction to which it may be subjected will cause it to gravitate toward a pendent vertical position, such as it is shown to occupy in the drawing. This gravitating movement being partaken of by the nut, it is, of course, screwed on the bolt, and is thus tightened in its place. This tightening of the nut on the bolt continues so long as the end $b$ of the washer is out of the center of gravity of the bolt; but after reaching this point it remains stationary. In addition to the tightening function which the washer performs, it also acts as a gib or lock for holding the nut, and preventing it from unscrewing from the bolt.

The device for lubricating the thread of the bolt and nut and the bearing-surface of the washer I find to be necessary to the proper working of the washer, as its gravitating movement is thereby facilitated. In addition to this the preserving properties of the lubricant admits of finer threads being used on the bolt and nut, and thereby makes it more difficult to unscrew the nut by any other than the ordinary means used for that purpose.

If any difficulty should be experienced in locating the washer in the proper position to make the gravitating movement available to the fullest extent, it may be obviated by altering the position of the bolt in the hole, or by giving the nut a quarter or half turn in the recess. By either or both of these means the proper location may be obtained.

What I claim as new, and desire to secure by Letters Patent, is—

The washer E, with gravitating extension $a$ and recess or seat $g$, in combination with the nut D and bolt C, substantially as and for the purpose hereinbefore described and set forth.

In testimony that I claim the foregoing I have hereunto set my hand this 12th day of April, 1875.

OBADIAH B. LATHAM.

Witnesses:
MILTON C. DONN,
GEORGE THOM.